Z. COBB.
SPRING SEAT.
No. 179,400.  Patented July 4, 1876.
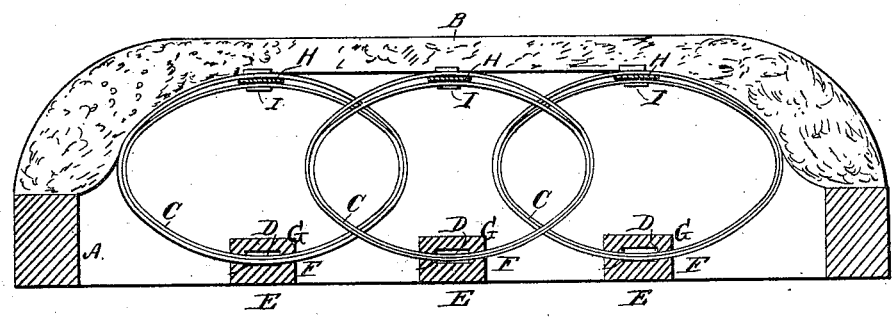
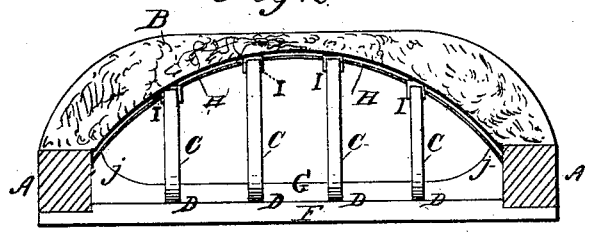
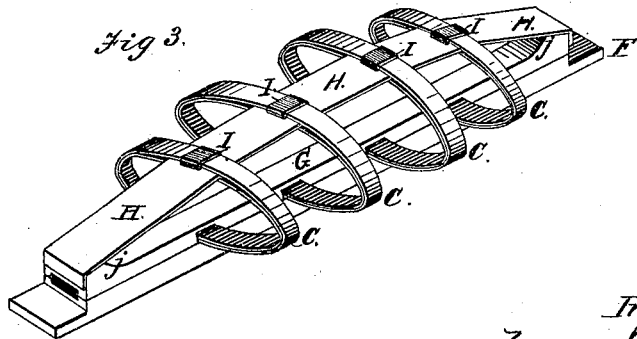
Witnesses:
Harry C Clark
FM ?
Inventor:
Zenas Cobb.
by Hill Ellsworth
his Attys.

UNITED STATES PATENT OFFICE.

ZENAS COBB, OF CHICAGO, ILLINOIS.

IMPROVEMENT IN SPRING-SEATS.

Specification forming part of Letters Patent No. 179,400, dated July 4, 1876; application filed July 3, 1872.

*To all whom it may concern:*

Be it known that I, ZENAS COBB, of Chicago, in the county of Cook and State of Illinois, have invented a new and useful Improvement in Springs for Seats, Beds, &c.; and I do hereby declare the following to be a full, clear, and exact description of the same, reference being had to the accompanying drawings, forming part of this specification, in which—

Figure 1 is a longitudinal section of a car-seat, showing the application of my improvements. Fig. 2 is a transverse section of the same, taken in the plane of the line $x\ x$, Fig. 1; and Fig. 3 is a perspective view of a set of springs detached from the seat.

Similar letters of reference in the accompanying drawings indicate the same parts.

My invention has for its object to improve the construction of upholstered spring-seats for cars and other purposes; and to this end it consists, first, in arranging the spring of a seat in sections, which are separately adapted for application and removal from the under side of the upholstering through the bottom of the seat-frame, for the purpose of facilitating the construction of the seat, and preventing the upholstering from being disturbed or injured when it becomes necessary to repair the springs. It also consists in the method of constructing the spring-sections; and it finally consists in stretching a strip of webbing from end to end of a spring-section over the tops of the springs, so as to form a curved elastic support, upon which the cushion or upholstering rests evenly at all points to prevent it from unequal wear.

In the accompanying drawings, A is the frame of a car-seat; B, the cushion or upholstering, secured to its upper edge; and C C are the springs supporting the cushion. The springs are composed of flattened steel wire coiled in two or more leaves, which are prevented from slipping upon each other by clasps D, as described in my patent of July 4, 1871. The spring-sections of the seat are formed by securing several of the springs C, at suitable intervals, to each slat or cross-bar E of the seat-frame. In this example of my invention the slats are composed of two parts, F G, which are screwed or otherwise fastened together with several of the springs between them, the proximate faces of such parts being grooved longitudinally to receive the clasps D, and prevent the springs from tipping sidewise or slipping through the slats. The tops or uppermost parts of the springs in each section are connected together and supported by a strip, H, of webbing or other appropriate material passing between the leaves, and attached thereto by clasps I, which also serve to join the leaves of each spring together. The webbing is stretched or strained, so as to compress the springs to a greater or less degree, and its ends are firmly attached to the beveled faces $j$, formed upon the raised ends of the slat-pieces G.

The webbing and the springs thus compressed by its tension form a curved elastic surface to support the under side of the cushion uniformly when the spring-sections are applied to the seat-frame, and therefore prevent the upholstering from wearing unevenly. The sections are applied to the under side of the upholstering through the bottom of the seat-frame, and are held in place by securing the projecting ends of the slats to the lower edge of the frame, or in mortises formed therein, by any suitable means. The shoulders formed by the raised ends of the slat-piece F abut against the inner sides of the seat-frame, as shown in Fig. 2, and extend to a level, or nearly so, with the upper edge of the seat-frame, for the purpose of affording supports for the cushion or upholstering between the frame and end springs. The sections are arranged in the seat-frame at the proper distance from each other, to afford the requisite spring-supports for the upholstering, being, by preference, so placed that the springs in adjoining sections shall overlap or project past each other. The springs constitute the largest portion of the seat, so that the upholstering or cushion may be reduced in thickness considerably, thereby saving material and cheapening the cost of manufacturing the seat.

The spring-sections thus constructed and applied can be separately removed from the seat-frame through the under side thereof, for repairing the springs or seat proper, without disturbing or displacing the upholstering, and in case the cushion is to be repaired the outer covering need not be removed from the frame or separated therefrom at any point.

Having thus described my invention, I claim—

1. An upholstered or cushioned spring-seat, having its springs secured to the seat-frame in sections, which are separately adapted for application and removal from the frame without disturbing the upholstering, substantially as described.

2. The spring-sections, consisting of the divided slat E, having the raised end pieces $j$, the springs C, clamped between the two divisions of the slat, and the webbing H, stretched over the tops of the springs from one raised end piece to the other, substantially as described.

3. The webbing or other strip H, combined with the springs of a seat-slat, and stretched from end to end of the latter over the springs, so as to compress them and form an arc or curved elastic surface, upon which the upholstering is uniformly supported, substantially as described, for the purpose specified.

4. The combination of the springs C, webbing-strip H, clasps D I, and divided slat E, substantially as described, for the purpose specified.

5. The combination of springs C, webbing-strip H, clasps D I, and divided slat E, with the seat-frame A and its upholstering or cushion B, substantially as described, for the purpose specified.

ZENAS COBB.

Witnesses:
  NATHAN K. ELLSWORTH,
  E. A. ELLSWORTH.